(12) United States Patent
Khan et al.

(10) Patent No.: US 8,560,018 B2
(45) Date of Patent: Oct. 15, 2013

(54) FLEXIBLE SECTORIZATION IN WIRELESS COMMUNICATION SYSTEMS

(75) Inventors: Farooq Khan, Allen, TX (US); Cornelius Van Rensburg, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 714 days.

(21) Appl. No.: 11/556,855

(22) Filed: Nov. 6, 2006

(65) Prior Publication Data

US 2007/0135170 A1    Jun. 14, 2007

Related U.S. Application Data

(60) Provisional application No. 60/748,725, filed on Dec. 9, 2005.

(51) Int. Cl.
*H04W 36/00*     (2009.01)
*H04B 1/38*      (2006.01)
*H04M 1/00*      (2006.01)

(52) U.S. Cl.
USPC .......... 455/561; 455/562.1; 455/443

(58) Field of Classification Search
USPC .......... 455/561, 562.1, 453, 443, 3.01, 3.02
See application file for complete search history.

(56) References Cited

U.S. PATENT DOCUMENTS

| | | | |
|---|---|---|---|
| 5,771,449 A * | 6/1998 | Blasing et al. | 455/422.1 |
| 5,825,762 A * | 10/1998 | Kamin et al. | 370/335 |
| 6,351,654 B1 | 2/2002 | Huang et al. | |
| 6,400,966 B1 * | 6/2002 | Andersson et al. | 455/561 |
| 6,470,177 B1 * | 10/2002 | Andersson et al. | 455/91 |
| 6,505,043 B1 | 1/2003 | Aihara | |
| 6,597,927 B1 * | 7/2003 | Eswara et al. | 455/562.1 |
| 6,738,639 B1 * | 5/2004 | Gosselin | 455/519 |
| 7,203,520 B2 * | 4/2007 | Senarath et al. | 455/562.1 |
| 7,436,811 B2 * | 10/2008 | Putcha et al. | 370/343 |
| 7,519,029 B2 | 4/2009 | Takeda et al. | |
| 2003/0125040 A1 | 7/2003 | Walton et al. | |
| 2004/0214606 A1 * | 10/2004 | Wichman et al. | 455/562.1 |
| 2006/0025178 A1 * | 2/2006 | Tao et al. | 455/562.1 |
| 2006/0160551 A1 * | 7/2006 | Matoba et al. | 455/509 |
| 2007/0049308 A1 * | 3/2007 | Lindoff et al. | 455/509 |

FOREIGN PATENT DOCUMENTS

| | | |
|---|---|---|
| KR | 1020000077329 A | 12/2000 |
| KR | 1020030057467 A | 7/2003 |
| WO | WO 2006/113009 A1 | 10/2006 |

OTHER PUBLICATIONS

Notification of Transmittal of the International Search Report and the Written Opinion of the International Searching Authority, or the Declaration dated Feb. 19, 2008 in connection with PCT Application No. PCT/KR2007/005580.

* cited by examiner

*Primary Examiner* — Wesley Kim (57) ABSTRACT

A system, apparatus and method for flexible sectorization in a wireless communication system are disclosed. For example, a system for flexible sectorization in a wireless communication system is disclosed. The system includes a base communication unit, a plurality of first communication link sector generation units coupled to the base communication unit, and at least a second communication link sector generation unit coupled to the base communication unit. Each communication link sector generation unit is configured to generate at least one associated sector for radio coverage, and the number of first communication link sector generation units is not equal to the number of second communication link sector generation units.

20 Claims, 7 Drawing Sheets

FLEXIBLE SECTORIZATION IN WIRELESS COMMUNICATION SYSTEMS

CROSS-REFERENCE TO RELATED APPLICATION AND CLAIM FOR PRIORITY

The present application is related to U.S. Provisional Patent Application No. 60/748,725, entitled "BANDWIDTH ALLOCATION MECHANISM IN THE MULTIHOP CELLULAR NETWORKS," filed on Dec. 9, 2005, which is assigned to the assignee of the present application. The subject matter disclosed in U.S. Provisional Patent Application No. 60/748,725 is incorporated by reference into the present application as if fully set forth herein. The present application hereby claims priority, under 35 U.S.C. §119(e), to U.S. Provisional Patent Application No. 60/748,725.

FIELD OF THE INVENTION

The invention relates to the wireless communications field, and more particularly, but not exclusively, to flexible radio coverage sectorization in wireless communication systems.

BACKGROUND OF THE INVENTION

In conventional cellular communication systems, radio coverage is provided for a given geographic area via multiple base stations distributed throughout the geographic area involved. In this way, each base station can serve traffic in a smaller geographic area. Consequently, multiple base stations in a wireless communication network can simultaneously serve users in different geographic areas, which increases the overall capacity of the wireless network involved.

Figure 1:
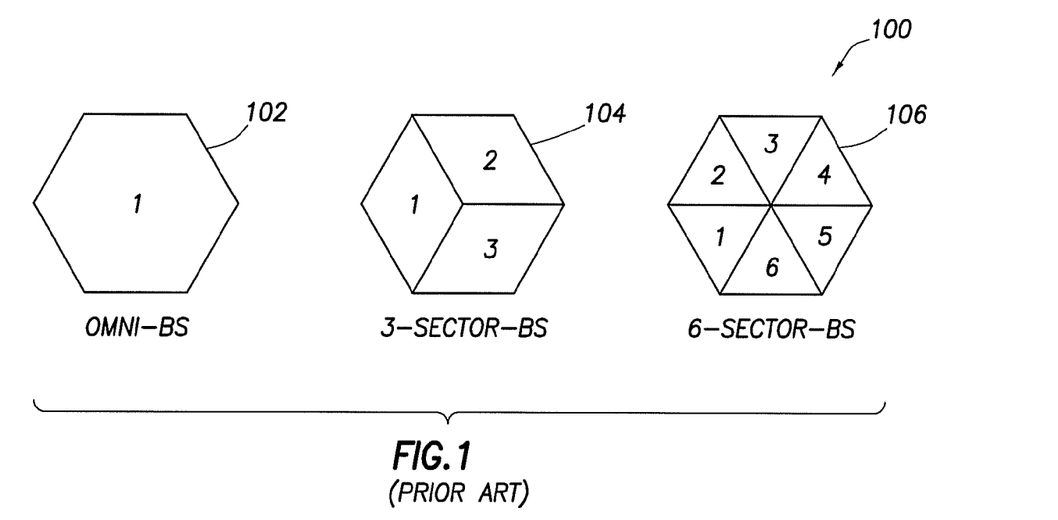
FIG. 1 is a pictorial diagram depicting examples of conventional sectorized radio coverage patterns for an omni-sector base station, a 3-sector base station, and a 6-sector base station.

In order to increase the capacity of certain wireless systems further, such as cellular systems, each base station may be configured to support radio coverage in multiple sectors. For example, a base station in a conventional cellular system may be configured to provide radio coverage in one sector, three sectors or six sectors. A pictorial diagram 100 depicting examples of conventional sectorized radio coverage patterns for an omni-sector base station 102, a 3-sector base station 104, and a 6-sector base station 106 are shown in FIG. 1. In those systems with multiple sectors per base station, each sector can handle part of the traffic in an additional smaller geographic area, which increases the overall capacity of the wireless network involved.

Figure 2:
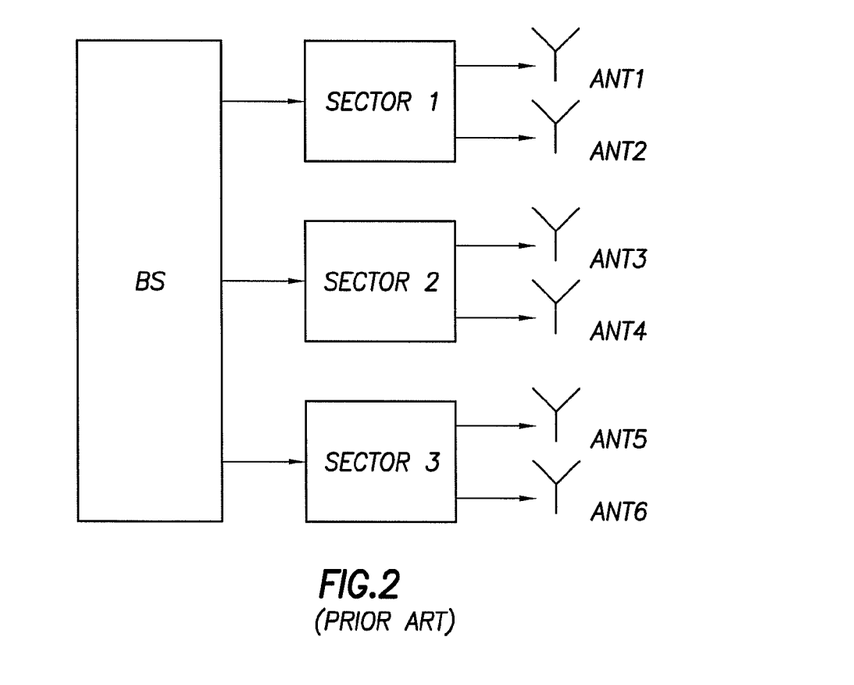
FIG. 2 depicts an example of a conventional wireless communication system with 3-sector coverage using two antennas per sector.

In currently deployed cellular systems, each base station typically supports 3-sector radio coverage with two receive antennas per sector. An example of such 3-sector coverage is shown in FIG. 2. The main rationale for having two receive antennas per sector is to provide 2-way receive diversity for uplink transmissions from mobile stations located in each sector's coverage area. In general, a mobile station is capable of producing only a relatively small amount of transmit power relative to that of a base station. For example, a typical base station's transmit power can be 20 dB higher than that of a mobile station. Therefore, a link-budget issue between the uplink and downlink has to be resolved, because the range of the uplink is much smaller than that of the downlink. This link budget limitation of the uplink is partly compensated for by providing two receive antennas per sector on the uplink. The two receive antennas can provide 3.0 dB receive beam-forming gain in addition to a significant amount of receive diversity gain on the uplink. This two-antenna approach is currently used to improve the uplink coverage of existing cellular systems.

Figure 3:
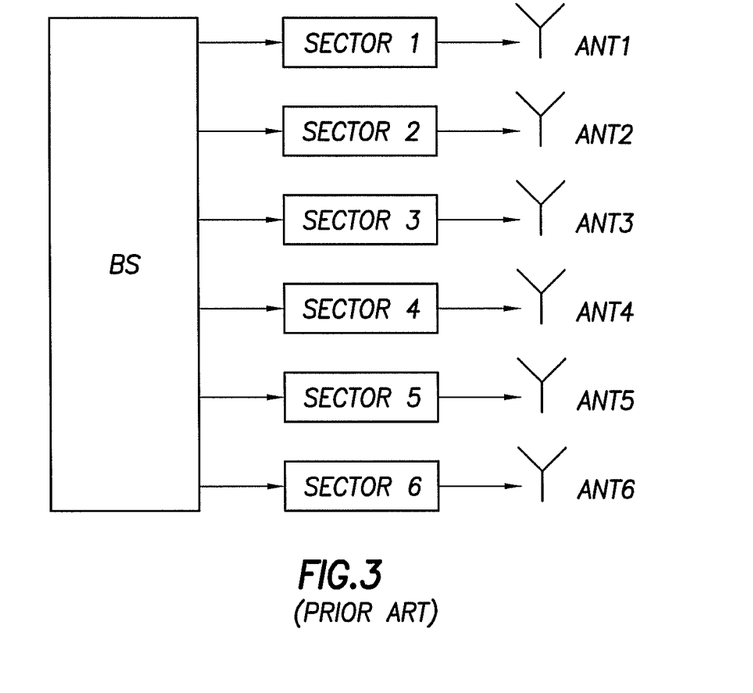
FIG. 3 depicts an example of a conventional wireless communication system with 6-sector coverage using one antenna per sector.

It is often desirable to include more than three-sector coverage on the downlink of a cellular system, in order to allow for resource usage that can potentially improve the system's capacity. However, for example, if the number of sectors per base station is increased to six, but the total number of antennas per base station is kept at six, then only one receive antenna per sector is available. An example of such 6-sector coverage is shown in FIG. 3. Notably, this one antenna per sector approach can seriously impact the uplink coverage due to the reasons mentioned above. An alternative approach is to increase the total number of transmit antennas per base station to 12. This 12 antenna approach could be supported by a base station with 6-sector deployment and two antennas per sector. However, the primary disadvantage of such an approach is the increased complexity and cost of the base station involved.

Figure 4:
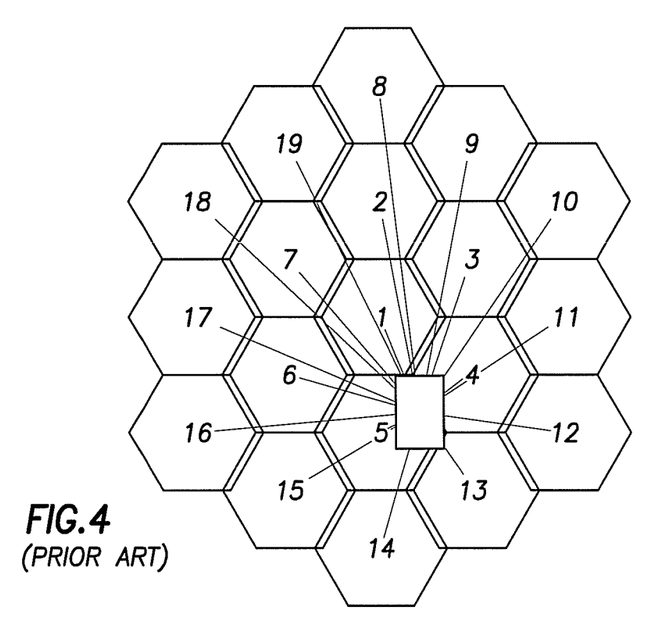
FIG. 4 is a pictorial diagram depicting an example of conventional single zone broadcast coverage.

If information is broadcast by a cellular system, the same content is transmitted simultaneously from all of the cells (or a subset of the cells) in the system involved. If the information is broadcast from a subset of the cells, the cells that are transmitting the same content are defined to belong to a single broadcast zone. An example of such broadcast coverage is shown in FIG. 4. For example, as depicted in FIG. 4, all of the 19 cells shown belong to a single broadcast zone, and each of the cells is transmitting the same information content. Therefore, it is possible for a receiver listening to the broadcast content to receive signals from all of the cells in the broadcast zone. If all of the cells in the broadcast zone are synchronized and Orthogonal Frequency Division Multiplex (OFDM) modulation is used for the transmissions, a Single Frequency Network (SFN) operation can be realized. In an SFN-based broadcast system, the signal from all of the cells in a broadcast zone can be collected at the receiver without interference, except for background noise and interference from cells not belonging to that broadcast zone. Therefore, using an SFN-based broadcast approach, the signal-to-interference-plus-noise ratio (SINR) of the received broadcast signal can be improved. As such, this approach allows for better recovery of the broadcast information. However, a disadvantage of using the above-described conventional broadcast approaches is that the number of sectors used has to be the same for both the uplink and the downlink.

SUMMARY OF THE INVENTION

In one example embodiment, a system for flexible sectorization in a wireless communication system is provided. The system includes a base communication unit, a plurality of first communication link sector generation units coupled to the base communication unit, and at least a second communication link sector generation unit coupled to the base communication unit, each communication link sector generation unit configured to generate at least one associated sector for radio coverage, wherein a number of first communication link sector generation units is not equal to a number of second communication link sector generation units.

In a second example embodiment, an apparatus for asymmetric radio coverage sectorization in a wireless communication system is provided. The apparatus includes a plurality of transmit base-band modules, a transmit beam-forming unit coupled to the plurality of transmit base-band modules, the transmit beam-forming unit configured to generate a first transmit beam and a second transmit beam, a first antenna coupled to the transmit beam-forming unit and configured to transmit the first transmit beam, a second antenna coupled to the transmit beam-forming unit and configured to transmit the second transmit beam, and a receive base-band module coupled to the first antenna and the second antenna, the receive base-band module configured to receive a signal via the first antenna and the second antenna.

In a third example embodiment, a method for flexible sectorization in a wireless communication system is provided. The method includes the steps of transmitting a first signal in a first radio coverage sector, transmitting a second signal in a second radio coverage sector, and at least one of transmitting and receiving a third signal in a third radio coverage sector, wherein the first and second radio coverage sectors in combination substantially overlap the third radio coverage sector.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Essentially, the present invention provides a system and method that enable the use of asymmetric radio coverage sectorization for both the downlink and uplink of a base station in a wireless communication system. In one example embodiment, a base station is configured to provide a 6-sector downlink and a 3-sector uplink. The downlink uses one transmit antenna per sector, and the uplink uses two receive antennas per sector. Consequently, the advantages associated with increased system capacity can be realized with the downlink configuration, and the advantages associated with 2-way receive diversity can be realized with the uplink configuration. Also, with such an asymmetric link configuration, the performance, range and coverage of the uplink remain unaffected, while the benefit of increased capacity due to higher sectorization can be realized on the downlink.

Figure 5:
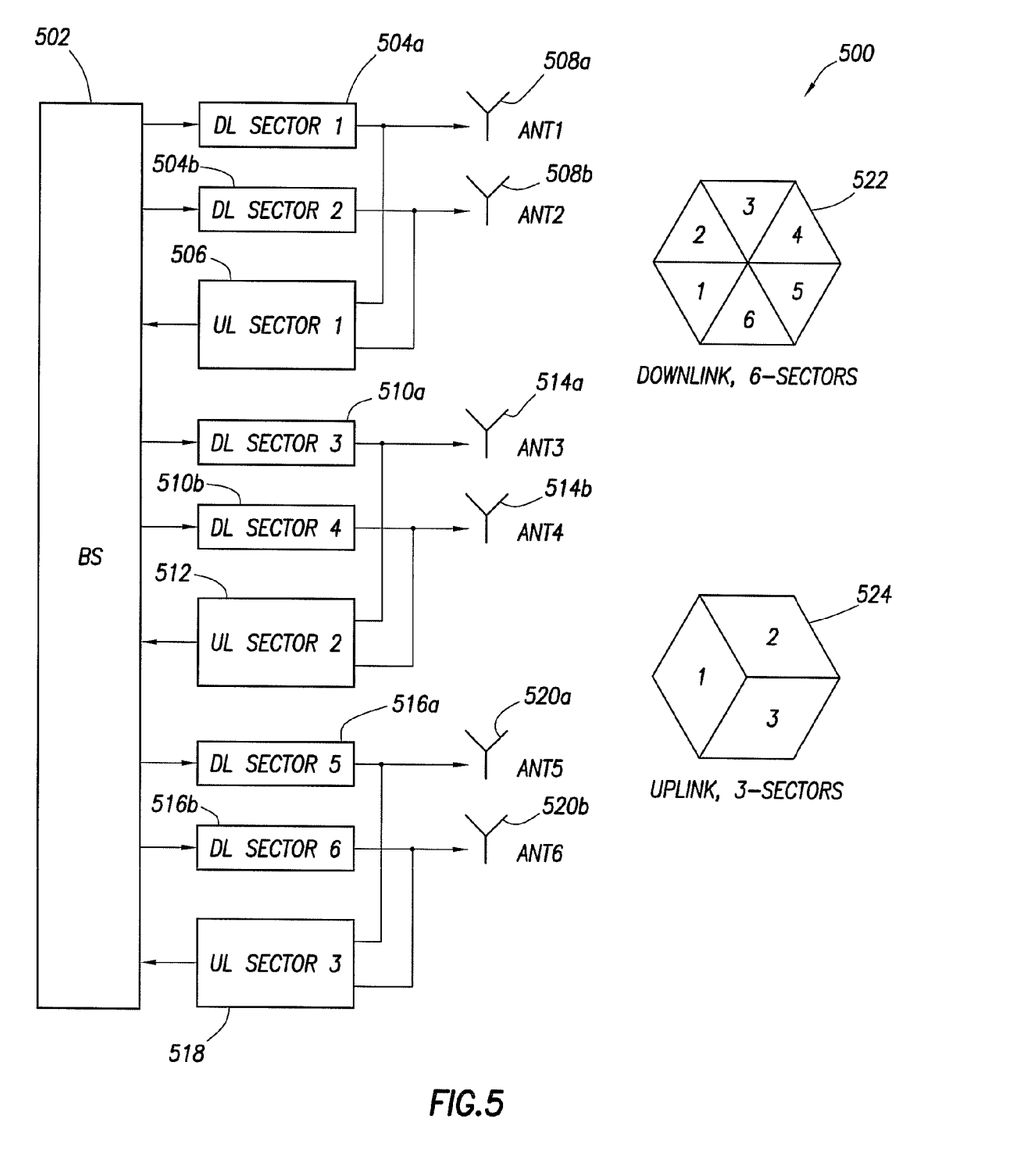
FIG. 5 depicts a system for flexible sectorization in a wireless communication system, which can be used to implement an example embodiment of the present invention.

As such, FIG. 5 depicts a system 500 for flexible sectorization in a wireless communication system, which can be used to implement an example embodiment of the present invention. For this example embodiment, the wireless communication system may be a cellular communication system operating in accordance with a Third Generation Partnership Project (3GPP) radio air interface protocol. However, it should be understood that the present invention is not intended to be limited to a particular architecture for a communication system, and can include within its scope any suitable wireless or mobile communication system that is capable of providing sectored radio coverage.

Specifically, for this example embodiment, system 500 includes a base station 502, which is configured for transmission of signals via six downlink sectors 504a, 504b, 510a, 510b, 516a and 516b, and reception of signals via three uplink sectors 506, 512 and 518. Downlink sectors 504a, 504b are coupled to antennas 508a and 508b, respectively, for transmission, and uplink sector 506 is coupled to antennas 508a and 508b for reception. Also, downlink sectors 510a, 510b are coupled to antennas 514a and 514b, respectively, for transmission, and uplink sector 512 is coupled to antennas 514a and 514b for reception. Additionally, downlink sectors 516a, 516b are coupled to antennas 520a and 520b, respectively, for transmission, and uplink sector 518 is coupled to antennas 520a and 520b for reception. An example 6-sector downlink radio coverage pattern 522 and a 3-sector uplink radio coverage pattern 524 for system 500 are also shown.

Note that the advantages of flexible radio coverage sectorization in wireless communication systems are different for the uplink and downlink traffic. However, in existing cellular systems, the sectorization configurations are required to be identical for the uplinks and downlinks. For example, a problem with the existing multiple antenna technologies is that a base station does not know in advance the condition of the downlink channel involved. Consequently, antenna beam-forming on the downlink is virtually impossible to implement in existing systems. In contrast, the base station knows the condition of the uplink channel. Consequently, it is possible to optimize the beam-forming process on the uplink. Existing sectorization approaches only provide gains in the downlink, because on the uplink, the base station typically uses maximal ratio combining (MRC) beam-forming, or minimum mean-squared error (MMSE) beam-forming for suppression of strong interference. These techniques are not available for the downlink, because the base station needs to obtain transmit channel information in order to perform MRC or MMSE beam-forming on the downlink.

Notably, the present invention provides an approach for flexible radio coverage sectorization in wireless communication systems, whereby the sectorization configurations for the uplinks and downlinks can be independently optimized. As such, the present invention provides an asymmetric sectorization approach, which improves the overall capacity and performance of both the downlink and uplink portions of the wireless systems involved. For example, the advantages of increased sectorization for the downlink are reduced interference, expanded bandwidth due to higher frequency re-use, and simplified processing since optimum beam-forming is not possible to perform. The primary advantage of increased sectorization for the uplink is simplified processing to accomplish bandwidth expansion. Note that bandwidth expansion by beam-forming in the base-band is more complicated but also more optimal, because no coverage holes are created. On the other hand, the disadvantages of increased sectorization for the downlink are the creation of coverage holes, and increased pilot signal pollution in Code-Division Multiple Access (CDMA) systems. The disadvantages of increased sectorization for the uplink are the creation of coverage holes, and the approach would be sub-optimal because optimum beam-forming is possible. Furthermore, the ability to optimize the sectorization would depend on the type of traffic involved. For example, unicast downlink data traffic can benefit from the use of a higher number of sectors, but downlink broadcast traffic may benefit more from the use of a lower number of sectors because the same information is transmitted from all of the sectors within the broadcast zone.

Considering the advantages and disadvantages of increased sectorization, the present invention provides a flexible sectorization approach that allows downlink and uplink optimization with a reasonable amount of complexity. In other words, the inventive approach strives to strike a balance between complexity and optimality. In that regard, a second example embodiment of a system that can be used to implement flexible sectorization in a wireless communication system is depicted in the block diagram shown in FIG. 6. For example, system 600 depicted in FIG. 6 may be used to implement flexible sectorization in system 500 shown in FIG. 5.

Figure 6:
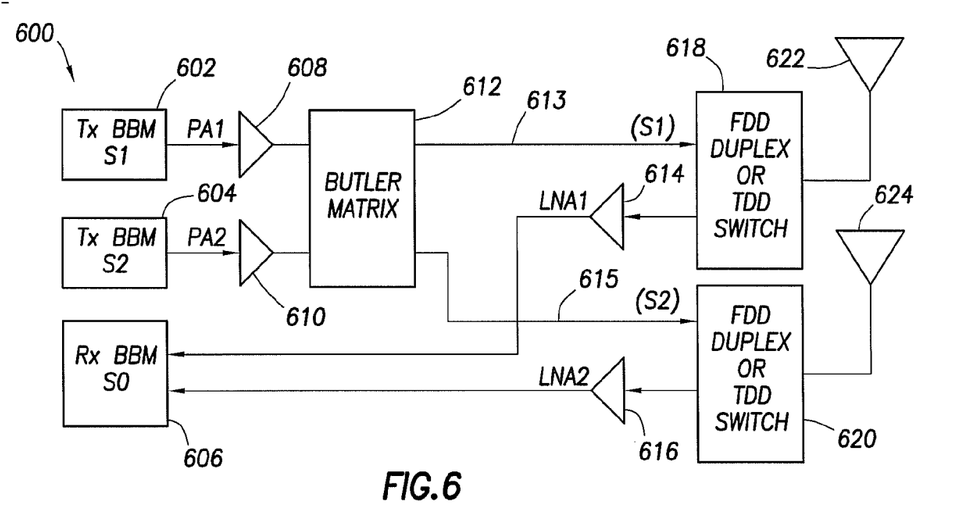
FIG. 6 depicts a block diagram of a second example embodiment of a system that can be used to implement flexible sectorization in a wireless communication system such as, for example, the system shown in FIG. 5.

Referring to FIG. 6, for this example embodiment, system 600 includes a plurality of transmit base-band modules 602 and 604, and a receive base-band module 606. Transmit base-band module 602 is configured for radio coverage in a first downlink sector S1, and transmit base-band module 604 is configured for radio coverage in a second downlink sector S2. The receive base-band module 606 is configured for radio coverage in an uplink sector S0.

The base-band signals from the first transmit base-band module 602 are coupled to an input of a Butler Matrix 612 via a first power amplifier 608, and the base-band signals from the second transmit base-band module 604 are coupled to a second input of the Butler Matrix 612 via a second power amplifier 610. Each power amplifier 608, 610 amplifies the base-band signals from the respective transmit base-band module 602, 604.

Essentially, the Butler Matrix is a microwave feed circuit that can be used for electronic beam scanning in antenna systems, which performs a discrete-Fourier transform (DFT) on the analog signals to be transmitted. Typically, a digital processor executes a Fast Fourier Transform (FFT) algorithm in order to realize the Butler Matrix, which can be implemented with such microwave components as hybrids, phase-shifters, and cross junction devices. It is important to note that although a Butler Matrix is used for antenna beam scanning in this example embodiment, the present invention is not intended to be so limited, and can include the use of any suitable mathematical algorithm that can enable electronic scanning to move multiple antenna beams. It is also important to note that the present invention also covers other techniques of directing antenna beams to form sectorized coverage, such as, for example, mechanically-directed multiple antenna beams.

For this example embodiment, a primary function of Butler Matrix 612 in system 600 is to form two orthogonal beams, so that the radio coverage for downlink sectors S1 and S2 can be directed (e.g., by electronic scanning) to two distinct geographic areas via the two orthogonal beams. For example, the signals to be transmitted in sector S1 are coupled via line 613 to a first duplexer/switch unit 618, and then transmitted via a first antenna 622. Similarly, the signals to be transmitted in sector S2 are coupled via line 615 to a second duplexer/switch unit 620, and then transmitted via a second antenna 624. If a frequency-division duplex (FDD) modulation scheme is used, units 618 and 620 can be configured as duplexers. If a time-division duplex (TDD) modulation scheme is used, units 618 and 620 can be configured as switches. In any event, for this example embodiment, it may be assumed that the two transmit antennas 622, 624 are configured to cover the same geographic area.

Alternatively, on the uplink, signals received by the two antennas 622, 624 in the uplink sector, S0, are demodulated by a respective duplexer/switch unit 618, 620, and then amplified by a respective low-noise amplifier 614 and 616. The two amplified signals are then coupled to the receive base-band module 606 and combined, in order to provide 2-way receive diversity gain. Note that, on the uplink, there is radio coverage in only one sector, S0, where the two wide-beam antennas 622, 624 can collect energy from all of the mobile units located within the entire coverage area. Also, note that the coverage area for uplink sector S0 is equal to the coverage area of downlink sector S1 plus that of downlink sector S2. As such, on the uplink, the beam-forming process is performed in the base-band module (606), because that base-band module has all of the information it needs to perform optimal beam-forming. For example, if the mobile units located within the coverage area of sector S0 are separated by suitable distances, it is possible for the mobile units to use the same time-frequency resource in an OFDM-based system, because the receive base-band module 606 can separate the received signals effectively. As such, the wireless system may attain additional bandwidth expansion using a Spatial Division Multiple Access (SDMA) approach.

Figure 7:
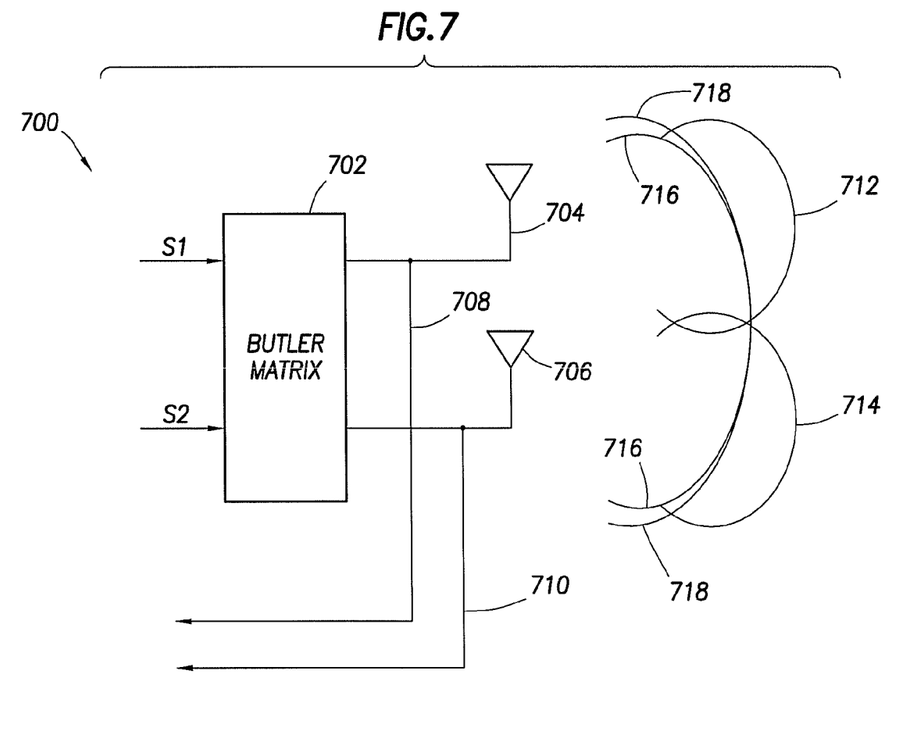
FIG. 7 depicts a block diagram showing examples of radio coverage patterns for a flexible sectorization system, such as, for example, the system shown in FIG. 6.

FIG. 7 is a block diagram 700 that depicts examples of radio coverage patterns for a flexible sectorization system, such as, for example, system 600 shown in FIG. 6. As illustrated by the example embodiment shown in FIG. 7, signals to be transmitted in two downlink sectors, S1 and S2, are processed through a Butler Matrix 702, which is used to form two orthogonal beams. The signals for sector S1 are transmitted by antenna 704, which forms the S1 sector coverage area 712. The signals for sector S2 are transmitted by antenna 706, which forms the S2 sector coverage area 714. The beam for sector S2 is orthogonal to that of sector S1. On the uplink, antenna 704 receives signals within a first coverage area 716 for sector S0, which are coupled via line 708 to a receive base-band module (not shown). Similarly, antenna 706 receives signals within a second coverage area 718 also for sector S0, which are coupled via line 710 to the receive base-band module. Note that the coverage areas 716 and 718 for receive antennas 704 and 706 substantially overlap each other.

Figure 8:
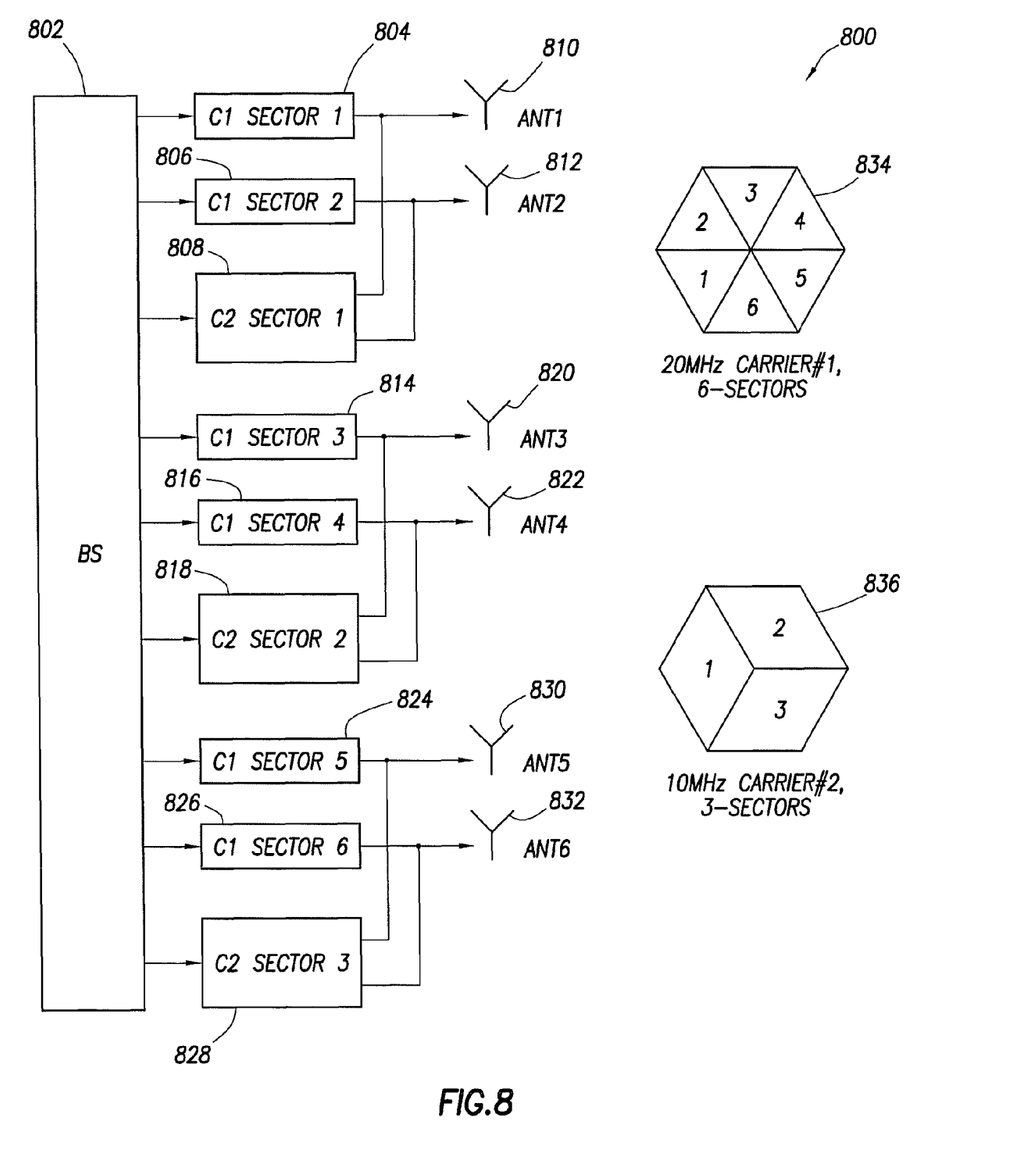
FIG. 8 depicts a block diagram of a system for flexible sectorization of a wireless communication system, which can be used to implement a third example embodiment of the present invention.

FIG. 8 depicts a block diagram of a system 800 for flexible sectorization of a wireless communication system, which can be used to implement a third example embodiment of the present invention. Essentially, this example embodiment illustrates that different frequency carriers can be transmitted via different sector configurations. Specifically, for this example embodiment, system 800 includes a base station 802, which is configured for transmission of a first carrier (e.g., 20 MHz) via six downlink sectors 804, 806, 814, 816, 824 and 826, and transmission of a second carrier (e.g., 10 MHz) via three downlink sectors 808, 818 and 828. The carrier 1 and carrier 2 downlink sectors 804, 806 and 808 are coupled to transmit antennas 810 and 812, and the carrier 1 and carrier 2 downlink sectors 814, 816 and 818 are coupled to transmit antennas 820 and 822. Additionally, the carrier 1 and carrier 2 downlink sectors 824, 826 and 828 are coupled to transmit antennas 830 and 832. An example 6-sector downlink radio coverage pattern 834 for carrier 1 of system 800 is shown, and an example 3-sector downlink radio coverage pattern 836 for carrier 2 of system 800 is also shown.

The asymmetric sectorization configuration of system 800 can support, for example, a network of high mobility users that require relatively frequent handoffs on carrier 2 with the 3-sector configuration, and low mobility users that require less frequent handoffs on carrier 1 with the 6-sector configuration. It is important to note that, for a given level of user mobility, increased sectorization results in more frequent handoffs. Therefore, the ability of system 800 to support high mobility users with a smaller number of sectors than those provided by conventional systems, can reduce the number of handoffs that typically have to be performed for these users.

In accordance with a different embodiment of the present invention, applying, for example, the asymmetric sectorization technique illustrated in FIG. 8, the number of sectors supported for different users in a cell can be different. For example, using Orthogonal Frequency Division Multiple Access (OFDMA) and Discrete Fourier Transform-(DFT-) Spread OFDM schemes, when frequency sub-bands are allocated to different users, sector asymmetry can be realized on a user-by-user basis. This approach assumes that suitable sub-band filters are provided at the receiver involved. For example, assuming that a sub-band of 1.25 MHz is used on the uplink with OFDMA and/or DFT-Spread OFDM, a 1.25 MHz filter will be required at the receiver if different uplink sector configurations for different users are required. A user's filtered signal either passes through or bypasses the Butler Matrix depending upon whether or not a one receive antenna (e.g., 6 sectors) or two receive antenna (e.g., 3 sectors) configuration is required for the user.

Figure 9:
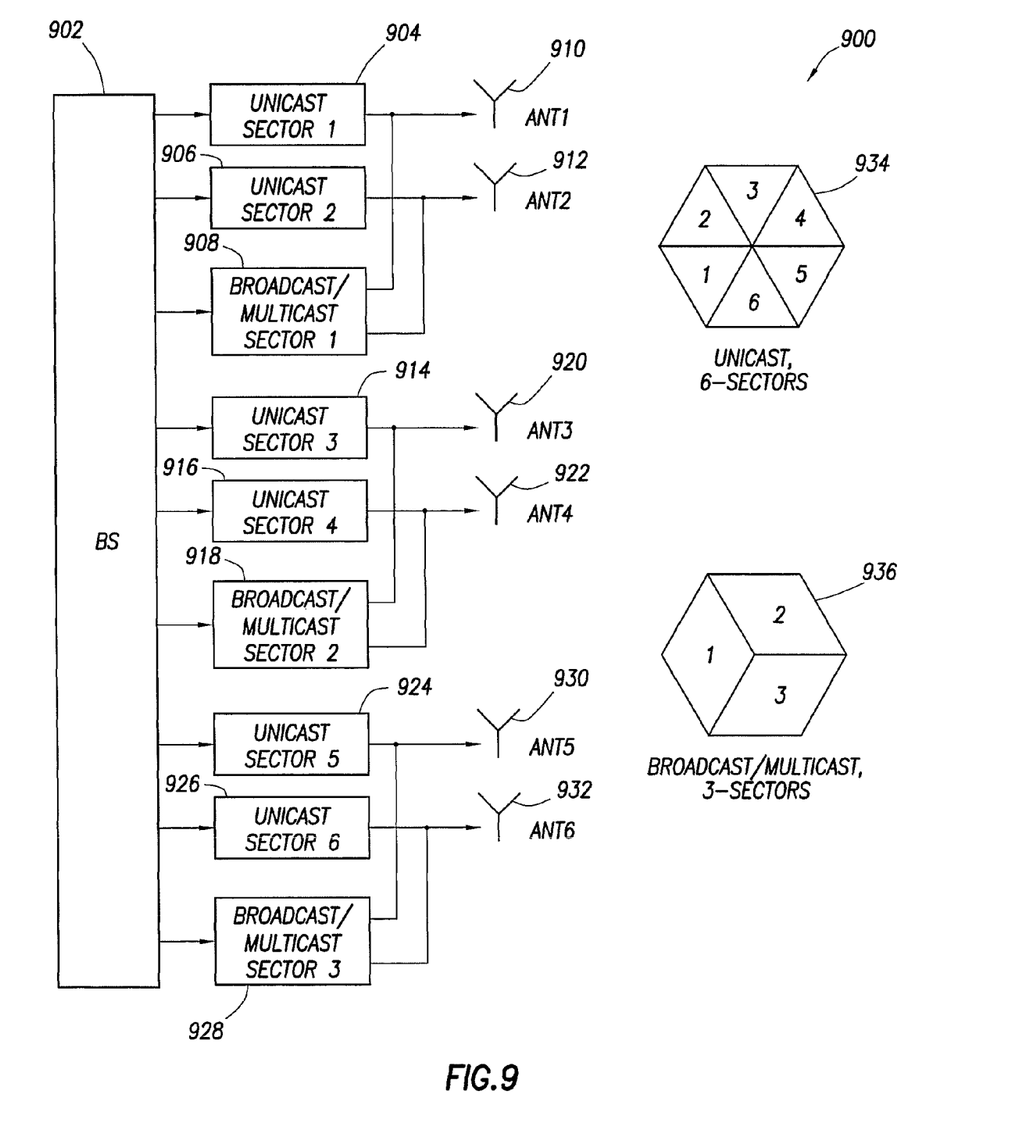
FIG. 9 depicts a block diagram of a system 900 for flexible sectorization of a wireless communication system, which can be used to implement a fourth example embodiment of the present invention.

FIG. 9 depicts a block diagram of a system 900 for flexible sectorization of a wireless communication system, which can be used to implement a fourth example embodiment of the present invention. Essentially, this example embodiment illustrates asymmetric sectorization with a larger number of sectors per base station being used for unicast traffic, and a smaller number of sectors per base station being used for broadcast/multicast traffic. In this example system, the broadcast traffic uses 3-sector base station configurations, and the unicast traffic is transmitted using 6-sector base station configurations. Such a configuration provides increased system capacity for the unicast traffic, because a larger number of unicast transmissions per base station can now be performed. The broadcast performance is also improved, because the number of coverage holes can be reduced or eliminated entirely. Also, the broadcast performance can be further improved by the use of cyclic delay diversity, space-time (ST) coding, or space-frequency (SF) coding for the broadcast traffic, because the broadcast traffic can be transmitted from two transmit antennas available per sector in those cases where 3-sector transmissions per base station are used.

Specifically, for this example embodiment, system 900 includes a base station 902, which is configured for transmission of unicast signals via six downlink sectors 904, 906, 914, 916, 924 and 926, and broadcast/multicast information via three downlink sectors 908, 918 and 928. Downlink sectors 904, 906 and 908 are coupled to transmit antennas 910 and 912, and downlink sectors 914, 916 and 918 are coupled to transmit antennas 920 and 922. Additionally, downlink sectors 924, 926 and 928 are coupled to transmit antennas 930 and 932. An example 6-sector downlink radio coverage pattern 934 for unicast traffic via system 900 is shown, and an example 3-sector downlink radio coverage pattern 936 for broadcast/multicast traffic via system 900 is also shown.

Figure 10:
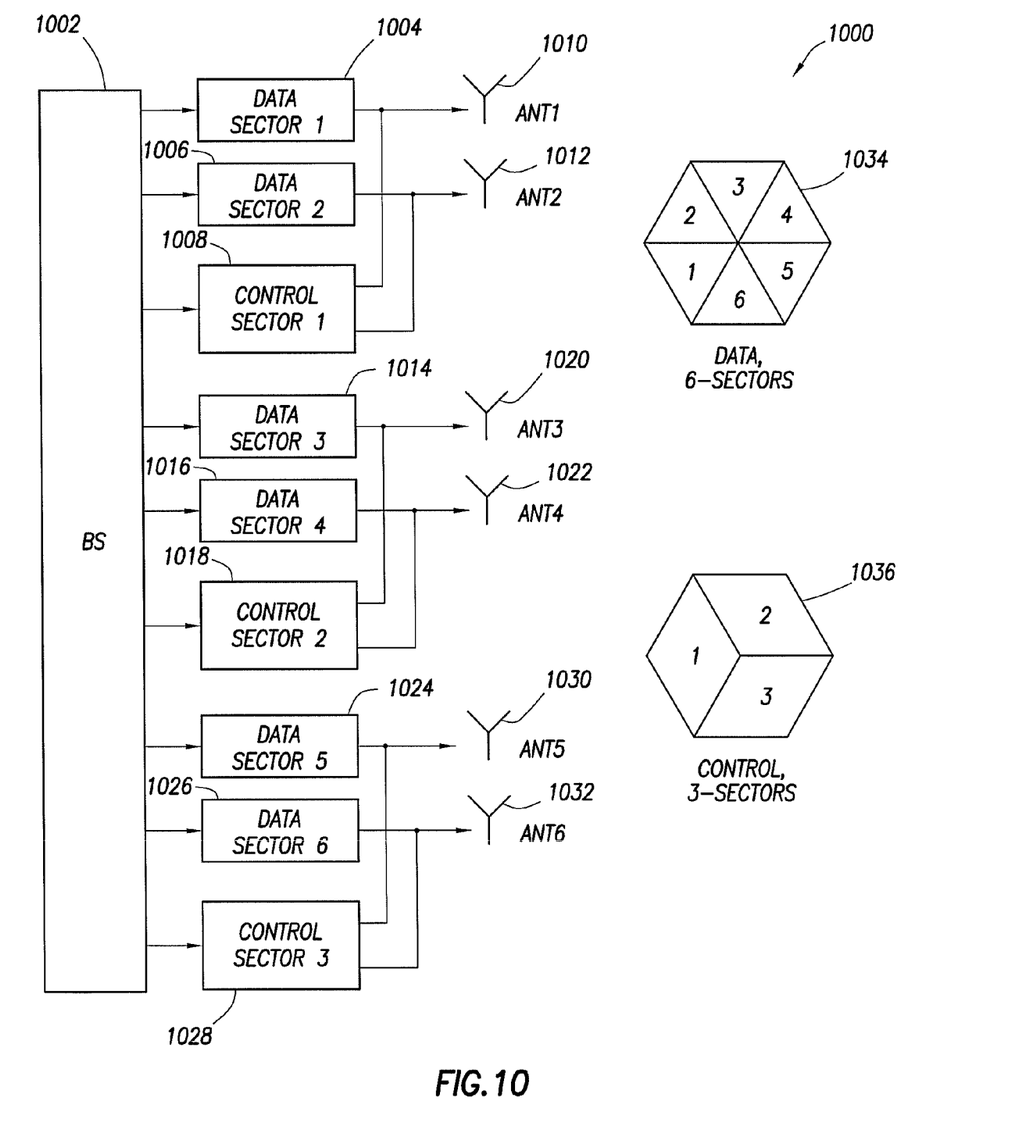
FIG. 10 depicts a block diagram of a system for flexible sectorization of a wireless communication system, which can be used to implement a fifth example embodiment of the present invention.

FIG. 10 depicts a block diagram of a system 1000 for flexible sectorization of a wireless communication system, which can be used to implement a fifth example embodiment of the present invention. Essentially, this example embodiment also illustrates a use of asymmetric sectorization, whereby a larger number of sectors per base station is used for data traffic, and a smaller number of sectors per base station is used for control and signaling. In this illustrative example, the signaling and control functions use 3-sectors per base station, and the unicast traffic is transmitted using 6-sectors per base station. This configuration allows increased system capacity for the data traffic, because a larger number of data transmissions per base station can now occur. The performance of the signaling and control functions is also improved, because the number of coverage holes is reduced or eliminated entirely. Note that the signaling and control functions require higher reliability than that of the data traffic, because data traffic can use re-transmission schemes, such as, for example, hybrid Automatic Repeat Request (ARQ). Also, the performance of the signaling and control functions can be improved further by using cyclic delay diversity, or ST or SF coding for the control signals, because the signaling and control signals can be transmitted from two transmit antennas available per sector in the case where 3-sector transmissions per base station are used. Notably, the flexible sectorization approach provided by the present invention allows a different number of sectors to be used for the uplink and downlink and also for different types of traffic and signaling. For example, in this embodiment, system 1000 allows the downlink data to be carried using a 6-sector configuration, while the uplink data and uplink control information are carried using a 3-sector configuration.

Specifically, for this example embodiment, system 1000 includes a base station 1002, which is configured for transmission of data traffic via six downlink sectors 1004, 1006, 1014, 1016, 1024 and 1026, and signaling and control signals via three downlink sectors 1008, 1018 and 1028. Downlink sectors 1004, 1006 and 1008 are coupled to transmit antennas 1010 and 1012, and downlink sectors 1014, 1016 and 1018 are coupled to transmit antennas 1020 and 1022. Additionally, downlink sectors 1024, 1026 and 1028 are coupled to transmit antennas 1030 and 1032. An example 6-sector downlink radio coverage pattern 1034 for data traffic via system 1000 is shown, and an example 3-sector downlink radio coverage pattern 1036 for signaling and control signals via system 1000 is also shown.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for flexible sectorization in a wireless communication system, comprising:
    a wireless base station;
    six first communication link sector generation units coupled to the wireless base station; and
    three second communication link sector generation units coupled to the wireless base station, each communication link sector generation unit configured to generate at least one associated sector for radio coverage, wherein the six first communication link sector generation units are configured to generate a six-sector downlink radio coverage pattern for data transmission at a first downlink carrier frequency associated with one or more low mobility users that handoff less frequently, and the three second communication link sector generation units are configured to generate a three-sector downlink radio coverage pattern for data transmission at a second downlink carrier frequency associated with one or more high mobility users that handoff more frequently.

2. The system of claim 1, wherein the wireless communication system comprises a cellular communication system.

3. The system of claim 1, further comprising a Bulter matrix coupled to two of the first communication link sector generation units, the Butler matrix configured to receive signals from the two coupled first communication link sector generation units and form two orthogonal beams.

4. The system of claim 3, further comprising a power amplifier coupled between the Butler matrix and each of the two coupled first communication link sector generation units.

5. The system of claim 4, further comprising a frequency-division duplex (FDD) compatible duplexer configured to receive an output of the Butler matrix.

6. The system of claim 4, further comprising a time-division duplex (TDD) compatible switch configured to receive an output of the Butler matrix.

7. The system of claim 1, wherein at least one of the first and second downlink radio coverage patterns is generated differently for a first receiver than for a second receiver.

8. The system of claim 1, wherein the six first communication link sector generation units are coupled to a plurality of associated antenna units, and the three second communication link sector generation units are coupled to the plurality of associated antenna units.

9. The system of claim 1, wherein the six first communication link sector units comprise six base-band modules coupled to a multiple-beamforming apparatus.

10. An apparatus for asymmetric radio coverage sectorization in a wireless base station in a wireless communication system, comprising:
    three pairs of transmit base-band modules;
    three transmit beam-forming units, each transmit beam-forming unit coupled to a respective one of the three pairs of transmit base-band modules, each transmit beam-forming unit configured to generate a first transmit beam and a second transmit beam;
    a first antenna coupled to each transmit beam-forming unit and configured to transmit the first transmit beam;
    a second antenna coupled to each transmit beam-forming unit and configured to transmit the second transmit beam; and
    a receive base-band module coupled to the first antenna and the second antenna, the receive base-band module configured to receive a signal via the first antenna and the second antenna,
    wherein the first and second antennas transmit the first and second transmit beams in a six-sector downlink radio coverage pattern for data transmission at a first downlink carrier frequency associated with one or more low mobility users that handoff less frequently, and transmit the first and second transmit beams in a three-sector downlink radio coverage pattern for data transmission at a second downlink carrier frequency associated with one or more high mobility users that handoff more frequently.

11. The apparatus of claim 10, wherein each transmit beam-forming unit comprises a matrix algorithm.

12. The apparatus of claim 10, wherein each transmit beam-forming unit comprises a Butler Matrix.

13. The apparatus of claim 12, further comprising a power amplifier coupled between the Butler matrix and the transmit base-band modules.

14. The apparatus of claim 10, wherein each first transmit beam is orthogonal to the second transmit beam.

15. A method for flexible sectorization in a wireless base station in a wireless communication system, the method comprising:
    transmitting a first data signal at a first downlink carrier frequency in a six-sector downlink radio coverage pattern, the first downlink carrier frequency associated with one or more low mobility users that handoff less frequently; and
    transmitting a second data signal at a second downlink carrier frequency in a three-sector downlink radio coverage pattern, the second downlink carrier frequency associated with one or more high mobility users that handoff more frequently,
    wherein the six-sector downlink radio coverage pattern substantially overlaps the three-sector downlink radio coverage pattern.

16. The method of claim 15, further comprising, at a Butler matrix, forming two orthogonal beams to transmit the first data signal.

17. The method of claim 16, further comprising amplifying the first data signal using a power amplifier.

18. The method of claim 15, wherein the wireless communication system comprises a cellular communication system.

19. The method of claim 15, further comprising duplexing the first data signal using a frequency-division duplex (FDD) compatible duplexer.

20. The apparatus of claim 10, wherein the wireless communication system comprises a cellular communication system.

* * * * *